(12) United States Patent
Briand et al.

(10) Patent No.: US 6,603,092 B2
(45) Date of Patent: Aug. 5, 2003

(54) HYBRID ELECTRIC-ARC/LASER WELDING PROCESS, ESPECIALLY FOR THE WELDING OF PIPES OR MOTOR-VEHICLE COMPONENTS

(75) Inventors: Francis Briand, Paris (FR); Christian Bonnet, Puiseux-Pontoise (FR)

(73) Assignee: L'Air Liquide-Societe Anonyme a Directoire et Conseil de Surveillance pour l'Etude et l'Exploitation des Procedes Georges Claude, Paris Cedex (FR)

( * ) Notice: Subject to any disclaimer, the term of this patent is extended or adjusted under 35 U.S.C. 154(b) by 30 days.

(21) Appl. No.: 09/870,013

(22) Filed: May 31, 2001

(65) Prior Publication Data

US 2001/0047984 A1 Dec. 6, 2001

(30) Foreign Application Priority Data

May 31, 2000 (FR) .............................................. 00 07014

(51) Int. Cl.$^7$ .............................................. B23K 26/00
(52) U.S. Cl. .............................. 219/121.64; 219/121.63; 219/121.85
(58) Field of Search ....................... 219/121.64, 121.63, 219/121.66, 121.85, 121.6

(56) References Cited

U.S. PATENT DOCUMENTS

| 4,507,540 | A | * | 3/1985 | Hamasaki | 219/121 LD |
| 5,700,989 | A | * | 12/1997 | Dykhno et al. | 219/121.45 |
| 5,859,402 | A | * | 1/1999 | Maier | 219/121.64 |
| 6,388,227 | B1 | * | 5/2002 | Dykhno et al. | 219/121.6 |

* cited by examiner

*Primary Examiner*—M. Alexandra Elve
(74) *Attorney, Agent, or Firm*—Young & Thompson

(57) ABSTRACT

Hybrid welding process and unit for welding metal workpieces, such as tailored blanks, by using a laser beam and an electric arc, preferably a plasma arc, in which process, after a welded joint has been produced, the laser beam is sent and/or deflected into radiation absorption means, such as an absorption cavity, allowing the radiation of the said beam to be absorbed. The beam continues to be deflected during the welding stop phase after producing one welded joint and before starting to weld a second welded joint. The process and the unit of the invention are particularly suitable for the mass production of workpieces for the motor-vehicle industry, such as tailored blanks that can be used to manufacture, for example, motor-vehicle body components, or for the mass production of pipes.

11 Claims, 1 Drawing Sheet

Fig 1          Fig 2
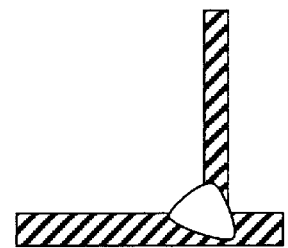
Fig 4          Fig 3
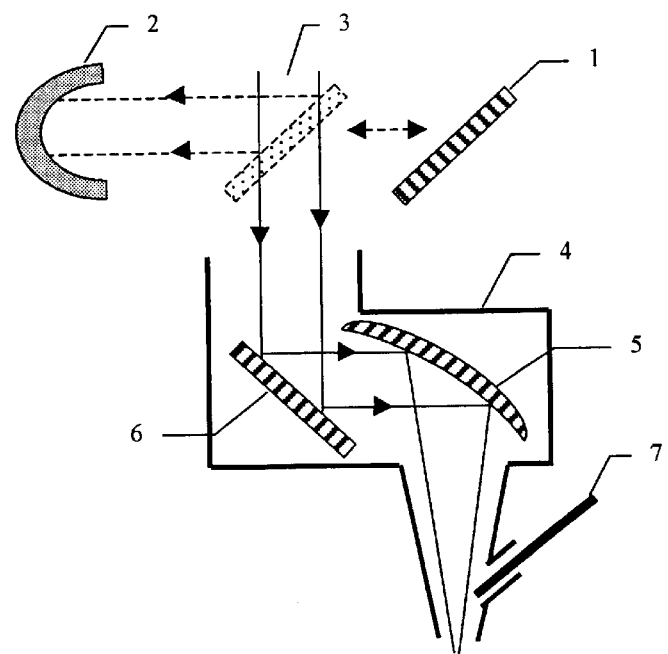
Fig 5

HYBRID ELECTRIC-ARC/LASER WELDING PROCESS, ESPECIALLY FOR THE WELDING OF PIPES OR MOTOR-VEHICLE COMPONENTS

FIELD OF THE INVENTION

The present invention relates to a hybrid welding process and to a hybrid welding set combining a laser beam and an electric arc, particularly a plasma arc, and to its application to the welding of tailored blanks intended for the motor-vehicle industry.

BACKGROUND OF THE INVENTION

Laser technology has been known and widely used for years to weld various metallic materials, such as workpieces made of alloy steels or non-alloy steels, coated steels, stainless steels, and aluminium and aluminium alloys. In general, a laser welding set comprises a solid-state or gas laser oscillator producing a coherent monochromatic high-energy beam, an optical path provided with deviating mirrors or else an optical fibre allowing the laser beam to be conveyed to a welding head located opposite the sheet to be welded. Conventionally, the welding head comprises a lens or one or more focussing mirrors so as to focus the laser beam onto one or more focal points in the thickness of the material to be welded and in the joint plane formed by joining together, edge to edge, the parts of the workpieces to be welded together so as to locally concentrate sufficient power density to melt the material to be welded. Usually, the welding head comprises a gas feed device for feeding with welding gas, also called assist gas, by means of a gas delivery nozzle placed coaxially with the laser beam. This gas feed device may also be external to the actual laser welding head.

An alternative solution for welding the edges of one or more workpieces to be joined together, for example the longitudinal edges of a metal sheet formed into a pipe, or of two metal workpieces brought together edge to edge, consists in melting the edges to be joined together by means of one or more electric arcs.

Some of these processes widely employed in industry use gas either as shielding gas or as active gas. In this regard, mention may be made of TIG (Tungsten Inert Gas), MIG (Metal Inert Gas), MAG (Metal Active Gas) processes or else plasma-arc processes.

In contrast, other processes do not generally use gas during the welding of the pipe, for example submerged-arc welding processes.

However, laser welding processes or arc-welding processes each have drawbacks which are specific to them.

Consequently, combined or hybrid processes have been developed which combine one or more laser beams with one or more electric arcs, particularly welding processes which combine a laser beam with an arc plasma jet, also called plasma-laser welding processes.

Various hybrid arc/laser welding processes have been described, for example in the documents EP-A-793558; EP-A-782489; EP-A-800434; U.S. Pat. No. 5,006,688; U.S. Pat. No. 5,700,989; EP-A-844042; *"Laser GTA Welding of aluminium alloy 5052"* by T. P. Diebold and C. E. Albright, 1984, pages 18–24; SU-A-1815085 and U.S. Pat. No. 4,689, 466; *"Plasma arc augmented laser welding"* by R. P. Walduck and J. Biffin, pages 172–176, 1994; or *"TIG or MIG arc augmented laser welding of thick mild steel plate"*, *Joining and Materials,* by J. Matsuda et al., pages 31–34, 1988.

In general, the plasma/laser or more generally an arc/laser welding process is a combined or hybrid welding process which combines electric arc welding with a laser beam.

The arc/laser process consists in generating an electric arc between an electrode, which may or may not be consumable, and the workpiece to be welded, and in focusing a powerful laser beam, especially a YAG-type or $CO_2$-type laser, in the arc zone, that is to say near or in the joint plane obtained by joining together, edge to edge, the parts to be welded together.

Such a hybrid process makes it possible to considerably improve the welding speeds compared with laser welding alone or with arc welding alone.

In addition, such a hybrid process furthermore makes it possible to appreciably increase the tolerances on positioning the workpieces before welding since laser welding alone requires high precision in positioning the parts to be welded because of the small size of the focal spot of the laser beam.

The use of a plasma/laser process, and more generally, of an an arc/laser process, requires the use of a welding head which makes it possible to combine, in a small space, the laser beam and its focusing device, and a suitable welding electrode. Several head configurations are described in the abovementioned documents and it may be stated, in summary, that the laser beam and the electric arc or plasma jet may be delivered by one and the same welding head, that is to say they leave via the same orifice, or else via two separate welding heads, one delivering the laser beam and the other the electric arc or plasma jet, the two coming together in the welding zone.

Arc/laser hybrid processes are especially suitable for welding tailored blanks for the automobile industry, since, in addition to the abovementioned advantages, they make it possible to obtain a weld bead which is well wetted and free of undercuts, as recalled in the documents EP-A-782 489 and *"Laser plus arc equals power"*, *Industrial Laser Solutions,* February 1999, pages 28–30.

Such welding consists in joining together two sheets or workpieces, generally made of steel, galvanized steel, or aluminium, of different thicknesses and/or different grades. Depending on the welding methods and preparations used, the joint to be welded is conventionally characterized by a difference in level between the upper planes of each of the workpieces to be welded, thus resulting in the creation of a "step", as shown in FIG. 1.

The reverse situation may also be encountered, namely joints of the tailored-blank type in which the upper planes are aligned but the lower planes of which are not on the same level and where therefore the "step" is located on the reverse side of the joint to be welded, as may be seen in FIG. 2.

Welds of this kind (FIG. 1 or FIG. 2) are often found in the motor-vehicle industry in which the workpieces thus welded are then pressed in order to give them their final shapes, for example the various workpieces which are used in the manufacture of a car body and, for example, the doors, the roof, the bonnet or the boot. They may also be found in the structural elements of the passenger compartment.

Furthermore, there also exists the case of workpieces to be welded together which are of the same thickness but of different grades from each other.

This hybrid process is also well suited to the welding of many types of joints such as, for example, the angle weld shown schematically in FIG. 3 and the lap weld shown in FIG. 4.

From the industrial standpoint, the use of such a hybrid process requires machines or robots which have either means for conveying and moving the workpieces to be welded under the plasma-laser welding head or means for moving the head itself over the workpiece to be welded.

Depending on the number of joints to be welded per workpiece and depending on the number of workpieces to be welded, these machines or robots require not only to be precisely positioned with respect to the welded joint to be produced but also, and above all, to be able to stop the welding operation intermittently.

This is because, as mentioned above, each of the workpieces to be welded may have several joints to be welded, for example joints located at different points on the workpiece in question, and it is then essential to stop the welding operation while the machine or robot positions the welding head on the next joint, or vice versa.

Likewise, the same operation must be carried out when changing new workpieces, that is to say after welding one workpiece and before welding the next workpiece.

This means that, during these welding stop operations, neither the laser beam nor the plasma arc must continue to impinge on the workpiece.

In the case of the plasma arc, preventing the arc from settling on the workpiece(s) to be welded is easily achievable in practice:

either by extinguishing the arc, that is to say by setting the welding current to zero;

or by preventing transfer of the arc onto the workpiece to be welded, that is to say by switching from a welding arc phase to a pilot arc phase during which the electric arc is established between the electrode and, for example, the inner surface of the plasma/laser welding head and therefore without any contact between the electric arc and the workpiece(s) to be welded. In general, this is achieved by greatly reducing the electric arc current (intensity) and by simultaneously setting the terminal part of the plasma/laser welding head to the potential of the workpiece to be welded.

Optionally, it is also possible, complimentarily, to reduce the gas flow rate and/or change the nature of the gas.

Thus, mention may be made of document EP-A-793 558 which recommends interrupting the electric arc and the laser beam almost simultaneously, by firstly reducing the electric current until the plasma arc has stopped and then de-exciting the laser at a selected moment after stopping the plasma arc.

However, this way of proceeding is not ideal as it is not adapted to the mass production of welded components, especially because of the time wastage and the loss of productivity that it entails.

A problem arises with the laser beam since, unlike the procedure that can be applied to the electric arc, it is not possible to stop or turn off the laser beam and then restart it or turn it back on as simply as the arc, as this results in large power instabilities when restarting it at the beginning of the next welding phase, and in time wastage and therefore loss of productivity since restarting the laser, at the beginning of the welding of the next joint, requires a relatively long time during which nothing can happen, that is to say no welding can be carried out, this time being necessary for thermally stabilizing the laser oscillator.

SUMMARY OF THE INVENTION

Thus, the present invention aims to solve this problem by providing an improved hybrid arc/laser welding process which makes it possible to avoid turning off the laser beam during the time period elapsing between the end of producing one welded joint and the start of welding the next joint, in particular in order to allow the machine or robot to position the welding head and the start of the joint plane to be produced relative to one another and/or to allow a change of new workpieces to be welded together, that is to say after welding one or more workpieces and before welding the next workpiece(s), and to do so without the laser impinging on the workpiece(s) to be welded or on the support frame supporting the workpieces while they are being welded, in order to prevent damage to the workpieces or to the unit itself.

The solution provided by the present invention is therefore a hybrid welding process and a hybrid welding unit, and the use of such a process or of such a unit in the welding of workpieces intended, in particular, for the motor-vehicle industry, such as tailored blanks.

More specifically, the invention relates to a process for welding one or more metal workpieces to be welded together by using at least one laser beam and at least one electric arc, in particular a plasma arc, in which process, after at least one welded joint has been produced on the said workpiece(s), the laser beam is sent and/or deflected into radiation absorption means allowing at least some of the radiation of the said laser beam to be absorbed.

BRIEF DESCRIPTION OF THE DRAWINGS

FIG. 1 depicts a welded joint which resulted in the creation of a step on the same side as the joint;

FIG. 2 depicts a welded joint which resulted in the creation of a step on the reverse side of the joint;

FIG. 3 depicts an angle weld joint;

FIG. 4 depicts a lap weld joint; and

FIG. 5 is a schematic representation of a hybrid arc/laser welding unit according to the invention.

DETAILED DESCRIPTION OF THE INVENTION

Depending on the case, the welding process of the invention may include one or more of the following characteristics:

the laser beam is sent and/or deflected into the radiation absorption means for at least part of the welding stop time elapsing between the end of welding one welded joint and the start of welding the next welded joint, preferably throughout the said welding stop time;

the radiation absorption means comprise at least one absorption cavity into which the laser beam is deflected and/or sent so that its radiation is absorbed therein, preferably the laser beam being deflected and/or sent into the said absorption cavity by means of one or more deflection mirrors;

the laser beam is emitted by a YAG- or $CO_2$-type laser and/or the electric arc is a plasma arc, preferably the laser beam and the said arc being delivered by a single welding head;

during at least part of the welding stop time elapsing between the end of welding one welded joint and the start of welding the next welded joint, especially right at the start of this welding stop phase or at the end of the welding phase, the electric arc current is interrupted, attenuated or reduced and preferably the electric arc current is interrupted, attenuated or reduced approximately in synchronism with the sending and/or deflection of the laser beam into the radiation absorption means making it possible to absorb at least some of the radiation of the said laser beam;

the workpiece or workpieces to be welded are made of a metal or a metal alloy chosen from coated or uncoated steels, particularly assembly steels, HYS steels, carbon steels, steels having a layer of zinc alloy on the surface, stainless steels, aluminium or aluminium alloys and high yield point steels, preferably the said workpiece or workpieces to be welded are tailored blanks, particularly those that can be used for manufacturing body components of a vehicle;

a gas chosen from argon, helium, nitrogen or mixtures thereof is used as laser beam assist gas and/or a gas chosen from argon, helium, nitrogen, hydrogen or mixtures thereof is used as plasma gas;

the workpieces to be welded together have the same thickness or different thicknesses and/or are of the same grade of material or of different grades, for example grades of the 5000 and 6000 series;

the workpieces to be welded together are made of coated or uncoated steels, aluminium or aluminium alloys;

the workpieces to be welded together are made of different metals or alloys, for example one of the workpieces is made of stainless steel and the other workpiece is made of non-stainless steel;

the workpieces are downhill- or flat-position-welded, that is to say butt-welded, lap-welded or angle-welded.

Moreover, the invention also relates to a hybrid arc/laser welding process, particularly a plasma/laser welding process, comprising:

(a) at least one welding step which combines an electric arc, particularly a plasma arc, with a laser beam; and (b) at least one welding stop step comprising, at the start of it, inrelative simultaneity, the following substeps (i) and (ii):

(i) extinction of the electric arc or switching of the plasma arc into a pilot arc and (ii) sending or deflecting the laser beam into a cavity for absorbing the laser power.

According to another aspect, the invention relates to a hybrid arc/laser welding unit comprising:

at least one laser beam generator for delivering at least one laser beam and at least one electrode supplied by at least electric current source in order to generate at least one electric arc, characterized in that it furthermore includes laser radiation absorption means making it possible to absorb, at least temporarily, at least some of the radiation of the said laser beam.

Depending on the case, the welding unit of the invention may include one or more of the following characteristics:

the laser radiation absorption means comprise an absorption cavity into which the laser beam is deflected and/or sent so that its radiation is absorbed therein, preferably the laser beam being deflected and/or sent into the said absorption cavity by beam deflection means;

it furthermore includes means for supporting the workpieces, making it possible to support and/or hold the workpieces to be welded during the welding; means for automatically feeding the workpieces to be welded, making it possible to automatically feed and/or position the workpiece(s) to be welded on the said support means; means for holding the workpieces to be welded, making it possible to hold the workpieces to be welded during the welding operation in position on the said support means; and/or means for automatically removing the welded workpieces, making it possible to remove the workpieces from the said support means after welding;

it includes control means making it possible to automatically control the means for feeding the workpieces to be welded; the means for removing the welded workpieces; the means for deflecting the laser beam; the stop and/or the end of the welding; and/or the relative movement of the head delivering the arc and of the head delivering the laser beam with respect to the workpieces to be welded;

the laser beam is emitted by a YAG or $CO_2$-type laser and/or the electric arc is delivered by a plasma-arc torch, preferably the laser beam and the said arc being delivered by a single welding head;

the beam deflection means comprise one or more moveable deflection mirrors, synchronization means preferably making it possible to synchronize the movement of the deflection mirror or mirrors and the movement of the workpiece to be welded or of the plasma/laser welding head or of the welding phase or of the welding stop phase.

According to yet another aspect, the invention relates to a process for manufacturing welded components or structures intended for the motor-vehicle industry, in which process at least one welding operation on the said components is carried out by the use of a hybrid arc/laser welding process or of a welding unit according to the invention.

In other words, the invention also relates to the use of a welding unit according to the invention to weld at least one tailored blank intended to form at least part of a vehicle body component, and to the use of a hybrid welding process according to the invention to assemble, by welding, metal workpieces having different thicknesses, particularly tailored blanks.

Moreover, the invention relates to a process for manufacturing vehicle body components, in which metal workpieces used in the construction of the said body components are welded by using a hybrid arc/laser welding process according to the invention, preferably metal workpieces made of aluminium or of aluminium alloy.

In other words, according to the present invention, it is not necessary to stop the laser beam during the welding stop phases separating the production of two successive joints or the welding of successive workpieces.

This is because, according to the invention, the laser beam is simply deflected into an absorption cavity where the laser radiation is absorbed.

This deflection may be carried out, for example, by means of a moving mirror which intercepts the beam and which sends it into the said cavity where the laser power is dissipated. This implies synchronization between the movement of the deflection mirror and, depending on the case, the starting of the welding phase, the stopping of the welding phase, the movement of the workpiece to be welded or of the plasma/laser welding head.

FIG. 5 shows schematically an embodiment according to the invention. A plasma/laser welding head 4 is in general composed of two mirrors, a plane mirror 6 and a spherical or parabolic mirror 5, and of an orifice through which the arc electrode 7 is inserted into the welding head. The laser beam 3 can thus be focussed onto the workpiece to be welded. When it is desired to stop welding, the deflection mirror 1 is interposed in the path of the beam so that the said laser beam is deflected into an optical well 2 where the laser beam is absorbed. Likewise, when it is desired to restart welding, the reverse operation is carried out, that is to say the deflection mirror 1 is removed from the path of the beam.

The process and the unit of the invention are particularly well suited to the mass production of workpieces for the motor-vehicle industry, such as the tailored blanks that can be used for manufacturing motor-vehicle doors or other components of the vehicle.

What is claimed is:

1. A welding process for welding one or more metal workpieces, which comprises
   producing at least one welded joint by using at least one laser beam and at least one electric arc; and thereafter
   sending or deflecting the laser beam into radiation absorption means thereby allowing at least some of the radiation of the laser beam to be absorbed.

2. The welding process according to claim 1, wherein the laser beam is sent or deflected into the radiation absorption means for at least part of a welding stop time elapsing between the end of welding one welded joint and the start of welding the next welded joint.

3. The welding process according to claim 1, wherein the radiation absorption means comprise at least one absorption cavity, and the laser beam is deflected or sent into the absorption cavity by one or more deflection mirrors.

4. The welding process according to claim 1, wherein the laser beam is emitted by a YAG- or $CO_2$-type laser, the electric arc is a plasma arc, and the laser beam and the arc are delivered by a single welding head.

5. The welding process according to claim 2, wherein during at least part of the welding stop time, the electric arc current is interrupted, attenuated or reduced.

6. The welding process according to claim 5, wherein the electric arc current is interrupted, attenuated or reduced approximately in synchronism with the sending or deflection of the laser beam into the radiation absorption means thereby making it possible to absorb at least some of the radiation of the laser beam.

7. The welding process according to claim 1, wherein the workpiece or workpieces to be welded are made of a metal or a metal alloy chosen from coated or uncoated steels including assembly steels, HYS steels, carbon steels, steels having a layer of zinc alloy on the surface, stainless steels, aluminum or aluminum alloys and high point steels.

8. The welding process according to claim 7, wherein the workpiece or workpieces to be welded are tailored blanks, components or structures that can be used for manufacturing body components of a vehicle.

9. The welding process according to claim 1, wherein the workpieces have different thicknesses.

10. The welding process according to claim 1, further comprising using a gas chosen from argon, helium, nitrogen or mixtures thereof as a laser beam assist gas, and using a gas chosen from argon, helium, nitrogen, hydrogen or mixtures thereof as a plasma gas.

11. An arc/laser welding process, which comprises:
   (a) at least one welding step which combines an electric arc with a laser beam; and
   (b) at least one welding stop step comprising, at the start of said welding stop step, in relative simultaneity, the following substeps (i) and (ii):
      (i) extinction of the electric arc or switching of the plasma arc into a pilot arc; and
      (ii) sending or deflecting the laser beam into a cavity for absorbing the laser power.

* * * * *